United States Patent
Jung et al.

(10) Patent No.: US 6,535,467 B1
(45) Date of Patent: Mar. 18, 2003

(54) APPARATUS AND METHOD FOR PROCESSING AUDIO SIGNALS RECORDED ON A MEDIUM

(76) Inventors: Han Jung, 454-23, Bangbae-dong, Socho-ku, Seoul (KR); Ki Won Kim, 443-22, Seryu 2-dong, Kwonsun-ku, Suwon-si, Kyungki-do (KR)

( * ) Notice: Subject to any disclaimer, the term of this patent is extended or adjusted under 35 U.S.C. 154(b) by 0 days.

(21) Appl. No.: 08/735,572

(22) Filed: Oct. 23, 1996

Related U.S. Application Data

(63) Continuation of application No. 08/307,288, filed on Sep. 16, 1994, now abandoned.

(30) Foreign Application Priority Data

Sep. 17, 1993 (KR) .............................................. 93-18841

(51) Int. Cl.[7] .............................................. G11B 7/005
(52) U.S. Cl. ................ 369/47.16; 369/47.2; 369/47.23; 369/53.37; 386/97; 386/99
(58) Field of Search ............................... 369/47–48, 54, 369/58, 111, 124, 124.01–124.15, 47.16, 47.2, 47.23, 53.2, 53.22, 53.31, 53.37, 59.14, 59.25, 59.27; 386/95–99

(56) References Cited

U.S. PATENT DOCUMENTS

| | | | | |
|---|---|---|---|---|
| 4,757,393 A | * | 7/1988 | Dakin et al. | |
| 5,177,728 A | * | 1/1993 | Otsubo et al. | 369/48 |
| 5,257,253 A | * | 10/1993 | Otsubo et al. | 369/48 |
| 5,475,499 A | * | 12/1995 | Taguchi | |
| 5,850,500 A | * | 12/1998 | Hirayama et al. | 386/97 |
| 5,933,398 A | * | 8/1999 | Fujinami | 369/47.16 |

* cited by examiner

Primary Examiner—W. R. Young
(74) Attorney, Agent, or Firm—Birch, Stewart, Kolasch & Birch, LLP

(57) ABSTRACT

A karaoke CD format and a device for controlling audio signals utilizing the karaoke CD format provides a user with selective reproduction of the voice of a player. The karaoke CD format includes a CD format divided into video sectors and audio sectors. The audio sectors are further divided into a part for recording accompaniment sound and vocal sound at the same time and a part for recording accompaniment sound only. Record coding information distinguishes the parts.

3 Claims, 6 Drawing Sheets

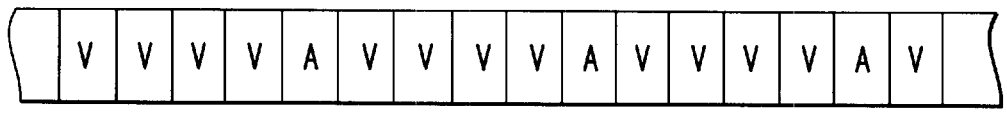
FIG.3
PRIOR ART
|  | MPEG VIDEO | MPEG AUDIO |
|---|---|---|
| FILE NUMBER | SEQUENCE NUMBER | SEQUENCE NUMBER |
| CHANNEL NUMBER | $ 01 | $ 01 |
| SUBMODE | %x11x001x | %x11x010x |
| CODING NUMBER | $ 0F | $ 7F |
FIG.4
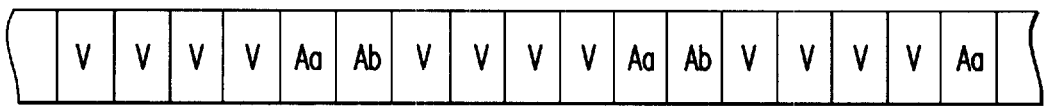
FIG.5

APPARATUS AND METHOD FOR PROCESSING AUDIO SIGNALS RECORDED ON A MEDIUM

This is a application Ser. No. 08/307,288, filed Sep. 16, 1994, now abandoned.

BACKGROUND OF THE INVENTION

1. Field of the Invention

This invention relates to a karaoke CD system, more particularly to a karaoke CD format and a device for processing audio signals utilizing the karaoke CD format which provides a user with selective reproduction of the voice of a player.

2. Description of Related Art

As shown in FIG. 1, a general disc data layout of a karaoke CD includes lead in/lead out areas 1 and 6 formed at the lead in and lead out of the CD for encoding CD-ROMXA data containing empty sectors of mode 2/form 2 therein, and program areas 2, 3, 4, and 5.

The program areas include a volume descriptor area 2 formed next to the lead in area 1 containing the path name of a CDI application program described in compact disc bridge system description. The basic data area 3 is for recording the title of a song, the name of the singer, the composer of the song, and the songwriter. The CDI application program area 4 is for recording an application program required for converting into compact disc bridge system description which will facilitate the operation of a disc in CD-RTOS (Real Time Operating System) in a CD-I/FMV player. The MPEG data area 5 is for recording MPEG (Moving Picture Experts Group) video and audio data.

The lead in area 1 has records of the number of songs, the period of time of each song and total period of time, and the lead in part and index part of each song. The lead out area 6 has record of the end of the program.

As shown in FIG. 2, a conventional karaoke CD system includes a first demodulation part 11 for demodulating EFM (Eight to Fourteen Modulation) signals. A second modulation part 12 for demodulating signals recorded in interleaved sectors for a CD-ROM upon receiving signals from the first demodulation part 11. A CPU 16 for demultiplexing system flow on receiving signals from the second demodulation part 12. A first, and a second memory 17 and 18 for storing video and audio data received from the CPU 16 respectively. A MPEG video decoder 19 and a MPEG audio decoder 20 for decoding MPEG video signals and MPEG audio signals of the video and audio data stored in the first and the second memories 17 and 18 respectively. A STC (System Time Clock) 23 for clocking the system time under the control of the CPU 16. A video and audio signal processing part 13 having a video presentation part 21 for comparing the STC of the STC part 23 to PTS (Presentation Time Stamps) in the bit stream received from the MPEG video decoder 19. An audio presentation part 22 for comparing the STC of the STC part 23 to PTS (Presentation Time Stamps) in the bit stream received from the MPEG audio decoder 20. A control part 10 for controlling both the first and the second demodulation parts 11 and 12 and for controlling the video and audio signal processing part 13 according to a key signal applied thereto. A Digital-to-Analog (D/A) converter 14 for converting the video signal received from the video presentation part 21 and outputting the converted signal to a monitor under the control of the control part 10, and a D/A converter 15 for converting the audio signal received from the audio presentation part 22 and applying the converted signal to a speaker under the control of the control part 10.

The interleaving of a conventional MPEG video and MPEG audio sectors is as shown in FIG. 3.

Since the quantity of MPEG video data is much greater than the quantity of MPEG audio data, an MPEG audio sector A is periodically positioned in between MPEG video sectors V. For example, one MPEG audio sector A may be present in every four MPEG video sectors V.

Shown in Table 1 is the audio channel encoding, which is to be explained in detail hereinafter.

TABLE 1

|  | Stereo Music Program | Special Music Program |
| --- | --- | --- |
| CH 0 | Left | mono without vocal |
| CH 1 | Right | mono with vocal |

The karaoke CD format includes a stereo music program having a left audio channel for encoding on MPEG audio channel 0 and a right audio channel for encoding on MPEG audio channel 1, and a special music program having one channel for encoding music accompaniment sound without vocal and the other channel for encoding music accompaniment sound with vocal.

Operation of the conventional karaoke CD system is to be explained hereinafter.

The karaoke data is read in through a pick-up, having EFM demodulated and CD errors corrected through the first demodulation part 11 which is an EFM/CIRC (Cross Interleave Read Solomon Code) decoder. The data interleaved at encoding is demodulated through the second demodulation part 12 which is a CD-ROM decoder. The data is divided into audio data and video data through the video and audio signal processing part 13 under the demultiplexing operation of the CPU 16 and applied to the MPEG video decoder 19 and MPEG audio decoder 20 through the first and the second memories 17 and 18 respectively.

The MPEG video decoder 19 and the MPEG audio decoder 20, restore the compressed data, and compare the STC from the STC part 23 to the PTS in the restored data to control the presentation time of the data.

However, such a conventional karaoke-CD system has the disadvantage of being unable to obtain stereophony sound in the case where music without vocal and music with vocal of a specific music program is carried on the first channel (Left) and the second channel (Right).

SUMMARY OF THE INVENTION

The object of this invention is to provide a user with selective reproduction of playing sound, i.e., voice (song of a singer) and accompaniment sound.

These and other objects and features of this invention can be achieved by providing a karaoke CD format which is divided into video sectors and audio sectors, and the audio sectors are further divided into a part for recording accompaniment sound and vocal sound at the same time and another part for recording accompaniment sound only. The audio sectors are further provided to record coding information for distinguishing between the audio data stored in the two parts. There is provided a device for controlling audio signals using a karaoke CD format including a control means for controlling the entire system according to signals applied from outside the system. There is provided a demodulation means for demodulating a signal read in from a CD which distinguishes between a part containing recorded accompaniment sound and vocal sound at the same time, and another part containing recorded accompaniment sound only under the control of the control means. There is provided an audio signal processing means for processing audio signals using signals received from the demodulation means and transmitting data corresponding to a first data signal corresponding to the accompaniment sound and vocal sound and a second data signal corresponding to the accompaniment sound only, a switching means for selecting one of the first or second data signals and outputting the selected data under the control of the control means, and a D/A converting means for converting the data received from the switching means and applying the converted data to a speaker under the control of the control means.

BRIEF DESCRIPTION OF THE DRAWINGS

FIG. 3 is a diagram showing a conventional interleaving of MPEG audio/video sectors.

FIG. 4 is a diagram of a subheader in accordance with this invention.

FIG. 5 is a diagram showing an interleaving of MPEG audio/video sectors in accordance with this invention.

DETAILED DESCRIPTION OF THE INVENTION

This invention is to be explained in detail hereinafter, referring to the attached drawings.

A subheader in accordance with this invention is shown in FIG. 4. To distinguish audio data Aa, containing both vocal sound and accompaniment sound, and audio data Ab, containing only accompaniment data, there is provided subheader information in an audio packet, the subheader includes coding information encoded therein with a distinguishing value applied thereto.

The coding information is, included into a subheader of each sector at data encoding as a distinguishing value, standardized as $0F in case of MPEG video, and $7F in case of MPEG audio, wherein new coding information (for example 3F) is added to use for a distinguishing signal for the audio data sector Aa, having both vocal sound and accompaniment sound, and the audio data sector Ab having only accompaniment sound.

Interleaving of MPEG video and MPEG audio sectors is as shown in FIG. 5. The interleaving of video data and audio data sectors, in general has 4 to 5 consecutive video sectors V with one audio sector A added thereto, where coding information is used to distinguish a sector containing the encoded Aa and Ab.

Since the increase of buffer size due to the newly added audio sectors Aa and Ab is infinitesimal compared to the image data, it can be ignored.

That is, the karaoke CD format in accordance with this invention includes a CD format divided into video sectors and audio sectors, and the audio sectors are further divided into a part Aa for recording both accompaniment sound and vocal sound at the same time and a part Ab for recording accompaniment sound only, and the audio sectors are further provided to record coding information for distinguishing between audio data stored in the two parts.

Figure 1:
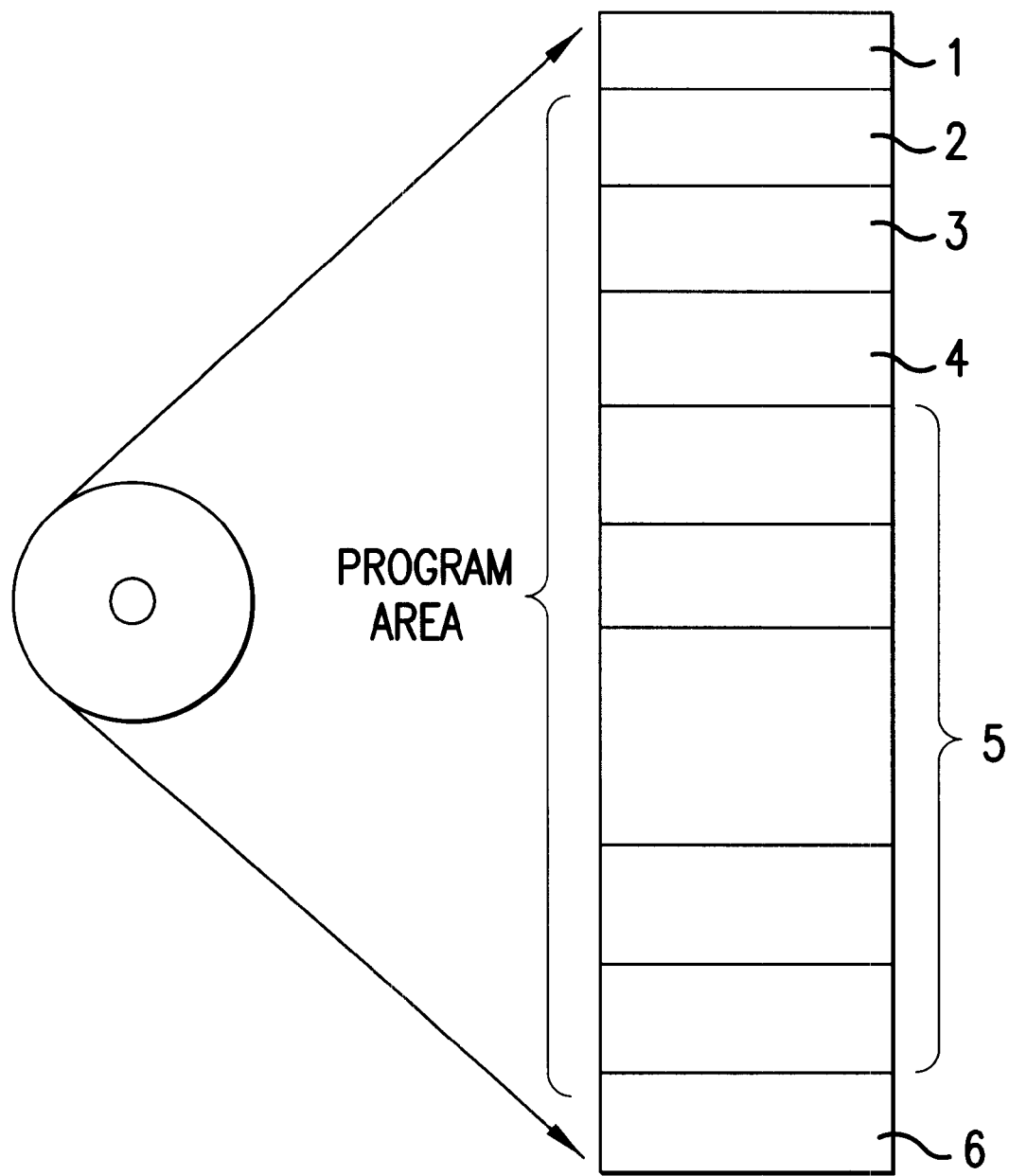
FIG. 1 is a layout of a karaoke CD data.
Figure 2:
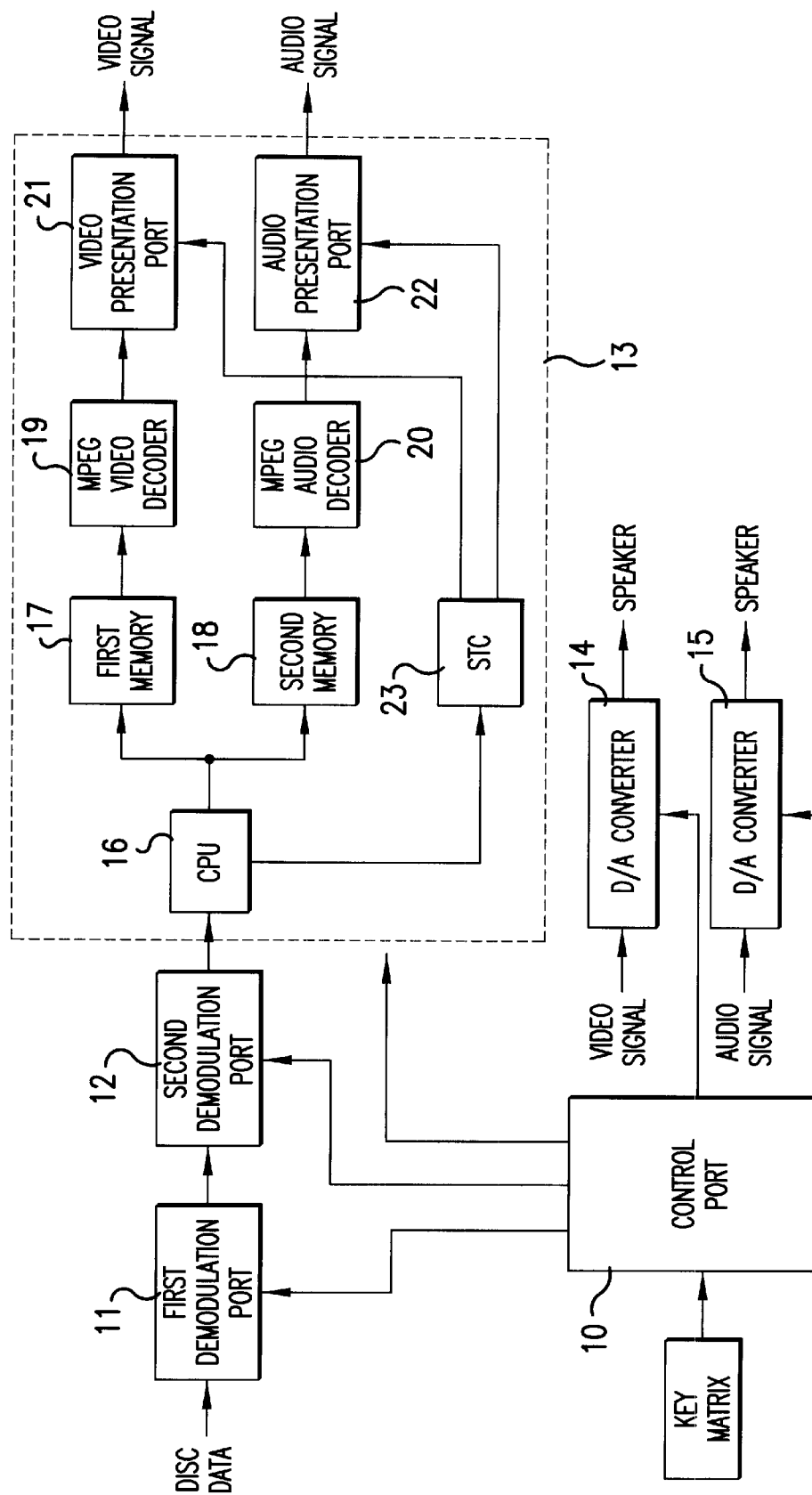
FIG. 2 is a block diagram of a conventional karaoke CD system.
Figure 6:
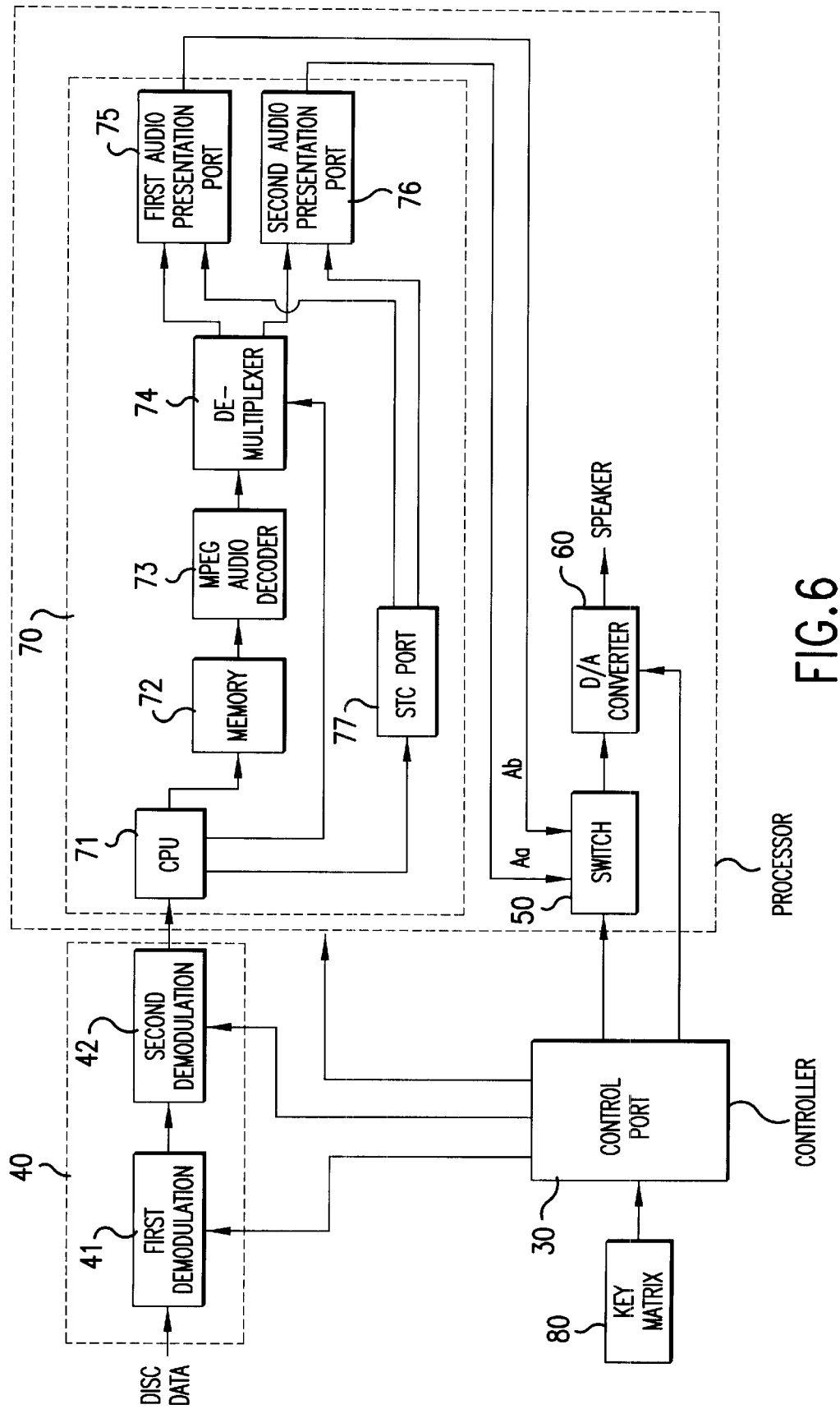
FIG. 6 is a schematic block diagram of a device for controlling karaoke CD audio signal in accordance with this invention.

As shown in FIG. 6, a device for controlling a karaoke CD audio signal in accordance with this invention in a state having the audio data interleaved as explained above, includes a control part 30, a demodulation part 40, an audio signal processing part 70, a switch 50, and a D/A converting part 60.

The control part 30 controls the entire system according to the signal applied through a key matrix 80.

The demodulation part 40 includes a first demodulator 41 for carrying out EFM demodulation from the CD format provided to distinguish a part Aa for recording accompaniment sound and vocal sound at the same time, and a part Ab for recording accompaniment sound only, where the part is under the control of the control part 30, and a second demodulator 42 for demodulating signals recorded in interleaved sectors for a CD-ROM from the signal received from the first demodulator 41 and applying the second demodulated signal to the audio processing part 70 under the control of the control part 30, thereby demodulating the signal read in from the CD format provided to distinguish a part Aa, for recording accompaniment sound and vocal sound at the same time, and a part Ab, for recording accompaniment sound only, under the control of the control part 30.

The audio signal processing part 70 includes a CPU 71 for separating audio data and time data from the signal received from the second demodulator 42 under the control of the control part 30, a STC (System Time Clock) part 77 for generating a synchronizing signal using time information received from the CPU 71, a memory 72 for storing the audio data received from the CPU 71, an MPEG audio decoder 73 for decoding the MPEG audio data stored in the memory 72, a demultiplexer 74 for separating data received from the MPEG audio decoder 73 into data corresponding to accompaniment sound and vocal sound and data corresponding to accompaniment sound and outputting the separated data under the control of the CPU 71, a first audio presentation part 75 for comparing the PTS (Presentation Time Stamp) in the data corresponding to the accompaniment sound received from the demultiplexer 74 to the signal received from the STC 77 to control presentation time of the data, and a second audio presentation part 76 for comparing the PTS (Presentation Time Stamp) in the data corresponding to accompaniment sound and vocal sound received from the demultiplexer 74 to the signal received from the STC 77 to control presentation time of the data, thereby processing the audio signal using signals received from the demodulation part 40 to separate the data into data corresponding to a first data containing accompaniment sound and vocal sound, and a second data containing accompaniment sound only, and outputting the separated data.

The switch 50 selects one of: the data corresponding to the accompaniment sound and vocal sound, or to only the accompaniment sound received from the first and the second audio presentation parts 75 and 76 of the audio signal processing part 70 and transmits the selected data under the control of the control part 30.

The D/A converter 60 converts the data received from the switch 50 under the control of the control part 30.

The system and operation for processing a video signal is the same as for a conventional karaoke CD system.

Operation of the device for controlling a karaoke CD audio signal in accordance with this invention as described above is to be explained hereinafter.

The encoded karaoke-CD data having coding information applied thereto is added with a distinguishing value and has EFM signals demodulated through the first demodulation part 41 which is a EFM/CIRC (Cross Interleave Read Solomon Code) and errors of the CD are corrected. The interleaved data at encoding is demodulated through the second demodulation part 42 which is a CD-ROM decoder, and is separated into audio, video, and time data in the CPU 71.

In the instant, of audio data, the demultiplexing signal coming in at the reading in of the coding information is applied to the demultiplexer 74 for operation of the demultiplexer 74.

Of the data demultiplexed in the CPU 71, the MPEG audio data is stored in the memory 72 temporarily, has the compression restored through the MPEG audio decoder 73, and is transmitted. The demodulated audio data received from the MPEG audio decoder 73 is separated into audio data carrying accompaniment sound only and audio data carrying accompaniment sound and vocal sound through the demultiplexer 74, and applied to the first audio data presentation part 75 and the second audio presentation part 76 respectively under the control of the CPU 71.

The audio demultiplexing signal received from the CPU 71 controls the first audio presentation part 75 to compare the received audio data Ab, carrying accompaniment sound only out of the audio signal applied thereto, to a PTS to control the presentation time and controls the second audio presentation part 76 to compare the received audio data Aa, carrying voice, i.e., vocal sound and accompaniment sound out of the audio signal applied thereto to a PTS to control the presentation time. The audio data received from the first and the second audio presentation parts 75 and 76 is applied to the D/A converter 60 through a switching operation of the switch 50 under the control of the control part 30, where it is converted in the D/A converter 60 and output to a speaker.

In this instant, the switch 50 is operated under the control of the control part 30 which is operated according to the key signal applied through the key matrix 80.

Figure 7:
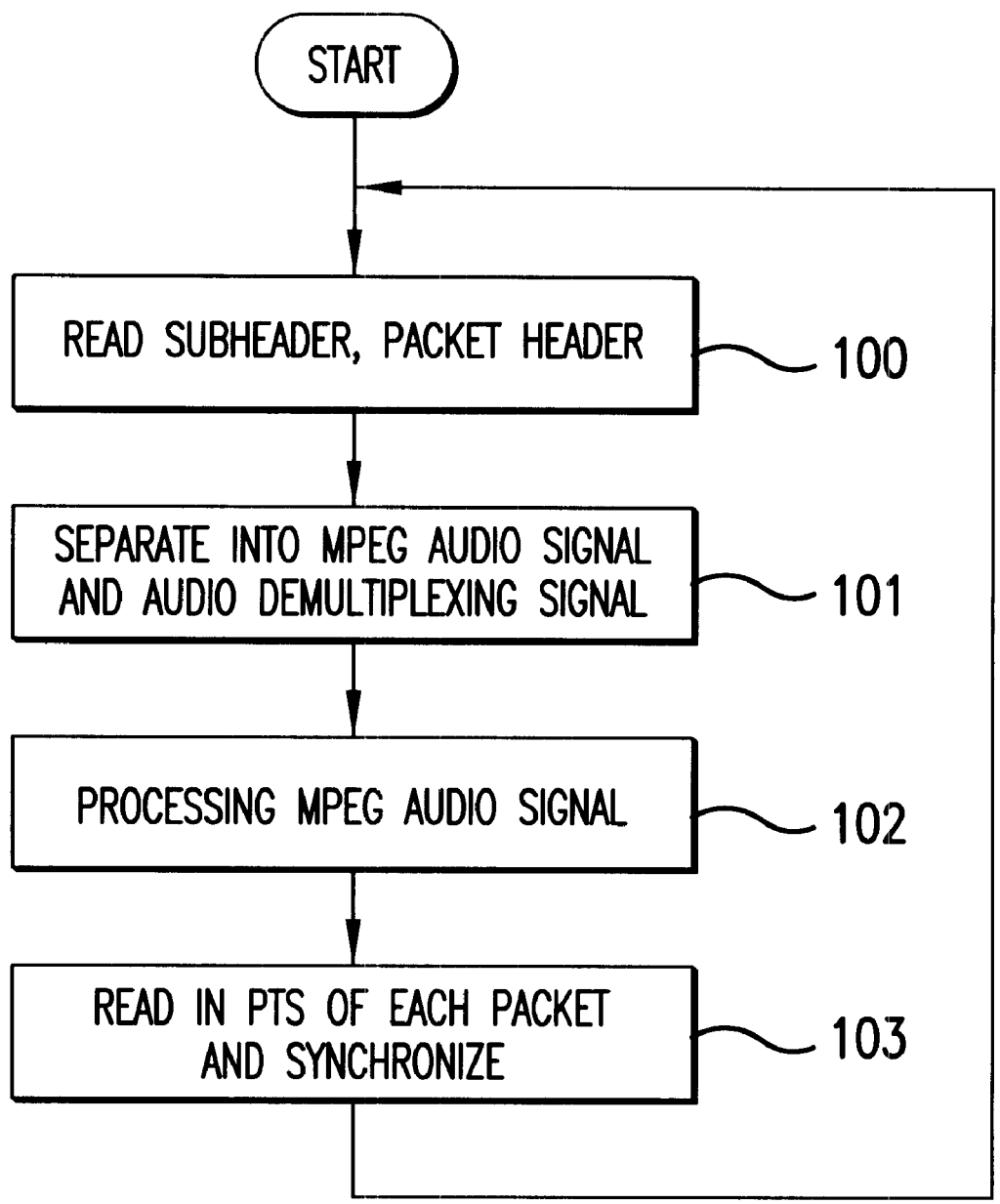
FIG. 7 is an operational flow diagram of a device for controlling karaoke CD audio signals.

Operation of a karaoke CD audio system is to be explained hereinafter, referring to FIG. 7.

First, a subheader and packet header are read 100, and demultiplexing is carried out to separate into an audio demultiplexing signal and a MPEG audio signal 101. The separated MPEG audio signal is decoded to separate into audio signals containing accompaniment sound only, and audio signals containing both vocal sound and accompaniment sound using the audio demultiplexing signal 102, and the PTS of each packet is read to synchronize and transmit signals 103.

Figure 8:
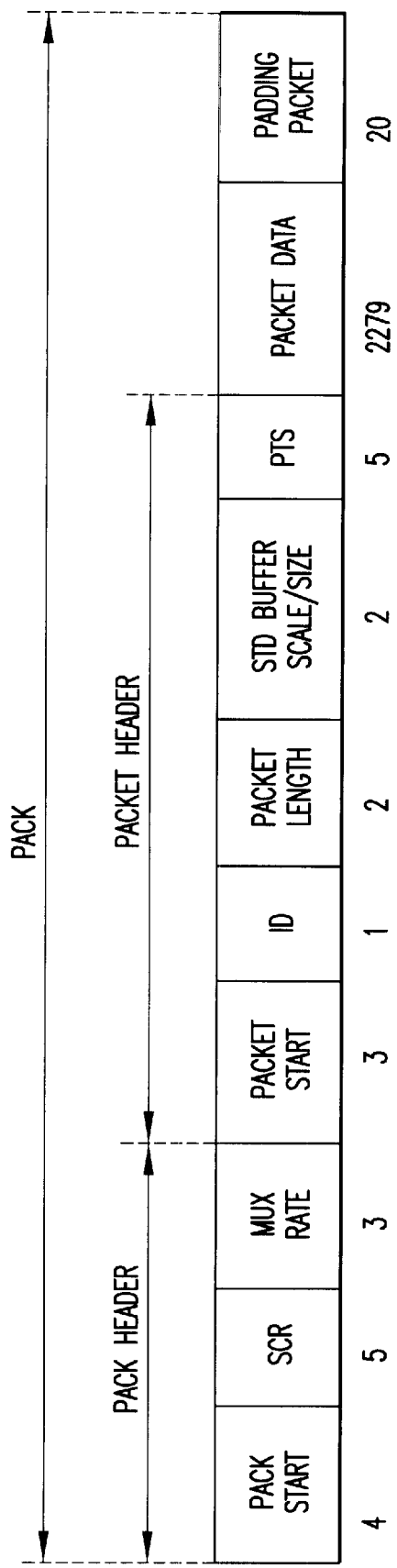
FIG. 8 is an MPEG audio format in accordance with this invention.

The MPEG audio format, as shown in FIG. 8, generates separated MPEG audio signals Aa and Ab, and audio demultiplexing signals by extracting coding information from the subheaders of each sector, and by reading the packet header and comparing it to the STC, thereby the presentation time of the data can be controlled.

As has been explained, this invention for a karaoke CD system increases the enjoyment of karaoke by reproducing audio data containing a player's voice, i.e., vocal sound and accompaniment sound, and audio data containing accompaniment sound selectively, which permits stereophony sound corresponding to the CD sound.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A karaoke device for processing digital data reproduced from an optical medium, the digital data including:

A) at least two types of digital audio data, including:
1) a first type of digital audio data being a mix of at least two kinds of audio data, and
2) a second type of digital audio data being only one kind of audio data;

B) and coding information, including:
1) first information indicating a coding mode of the digital audio data, and
2) second information, different than said first information, distinguishing the first type of digital audio data from the second type of digital audio data, said karaoke device comprising:
(a) a data processor processing the digital data reproduced from the optical medium, said data processor including a system time clock, a memory for storing said first and second types of digital audio data, and first and second audio presentation parts receiving said system time clock to control a presentation timing of said first or second type of digital audio data;
(b) a detector detecting the second information from the processed digital data; and
(c) an output device outputting selectively one of the first or the second types of digital audio data based on the detected second information.

2. The karaoke device according to claim 1, wherein said output device selects one of the first or the second types of digital audio data based on the detected second information and a user's input.

3. The karaoke device according to claim 1, wherein the first type of digital audio data includes accompaniment sound and voice sound, and wherein the second type of digital audio data includes only accompaniment sound.

* * * * *